Figure 1:
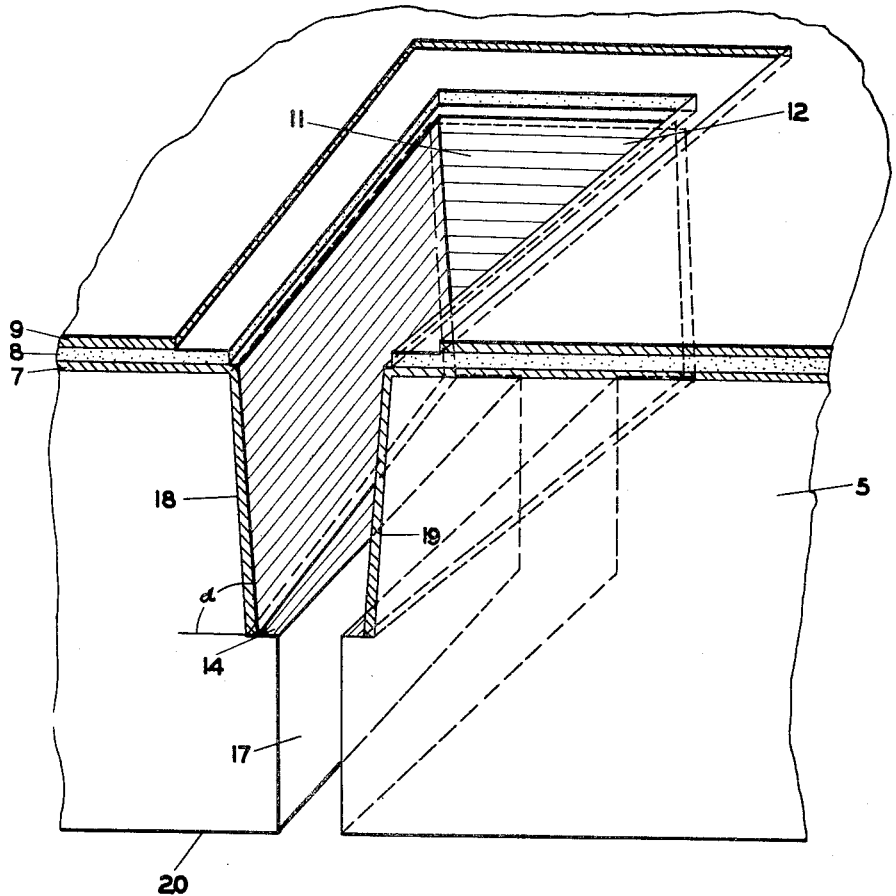

Dec. 31, 1946.  K. H. BALLARD  2,413,539
LEAD CONNECTION FOR ELECTRICAL APPARATUS
Filed Sept. 1, 1943  3 Sheets-Sheet 1

KERMIT H. BALLARD
INVENTOR.

BY

*E. H. O'Brien*

ATTORNEY

Dec. 31, 1946.   K. H. BALLARD   2,413,539
LEAD CONNECTION FOR ELECTRICAL APPARATUS
Filed Sept. 1, 1943   3 Sheets-Sheet 2

KERMIT H. BALLARD
INVENTOR.

BY

*E. H. O'Brien*
ATTORNEY

Dec. 31, 1946.   K. H. BALLARD   2,413,539
LEAD CONNECTION FOR ELECTRICAL APPARATUS
Filed Sept. 1, 1943   3 Sheets-Sheet 3

KERMIT H. BALLARD
*INVENTOR.*

BY

*ATTORNEY*

Patented Dec. 31, 1946

2,413,539

UNITED STATES PATENT OFFICE 2,413,539

LEAD CONNECTION FOR ELECTRICAL APPARATUS

Kermit H. Ballard, Perth Amboy, N. J., assignor to E. I. du Pont de Nemours & Company, Wilmington, Del., a corporation of Delaware Application September 1, 1943, Serial No. 500,807

9 Claims. (Cl. 173—324)

This invention relates to electrical capacitors or condensers and, more especially, to a new and improved terminal connection for attaching the electrical lead wires to the electrodes of the capacitor.

My invention is particularly adapted for use in securing lead wires to electrical capacitors of the type described and claimed in my copending applications, Serial No. 461,302, filed October 8, 1942, and Serial No. 494,627, filed July 14, 1943, wherein the capacitor is formed with electrodes comprising alternate layers of metallic silver separated by dielectric layers comprising a vitreous composition, the entire construction being formed on a supporting block preferably of ceramic material. However, it is not limited to utilization in connecting lead wires to electrical capacitors, but is of general use wherever lead wires are to be brought into electrical communication with metallic layers or surfaces on electrical apparatus generally.

In fabricating electrical condensers of this type wherein layers of ceramic metallic silver are utilized as the electrodes considerable difficulty has been experienced in attaching in electrical communication with those electrodes lead wires which will possess satisfactory mechanical strength. In various constructions previously utilized the lead wires or conductors have been soldered to exposed portions of the silver layer electrodes, but the soldered connections generally become disconnected, breaking the electrical connection when the condenser is subjected to even relatively slight vibration or mechanical handling. In an effort to avoid this difficulty lead wires have been attached to the base on which the condenser construction is supported in electrical communication with the silver layer electrodes by means of a low-melting glass serving as the cement. In another modification of this construction the end of the supporting ceramic base or tile is provided with sawed slots wherein a bent-in portion of the lead wire may be fitted before bringing it into communication with the silver electrode by soldering or by means of a low-melting glass cement. However, none of these methods of joining results in a construction possessing sufficient mechanical strength and ruggedness to stand up when the capacitor is subjected to severe twisting, when the lead wire is deformed in use, or even when it is subjected to a straight pull of moderate force. Under these circumstances the conductor becomes disconnected from the metallic electrode and the usefulness of the capacitor is destroyed.

I have now devised a new and improved attachment means which permits the attachment of an electrical conductor or lead wire to the metallic layer electrodes of an electrical capacitor in such a manner that the resulting assembly is more rugged and wear-resistant than previously considered possible under circumstances wherein a wire must be attached to a ceramic silver surface. The new and improved fastening method, and the improved joinder means and electrical capacitor resulting, is of such strength that when the assembled capacitor is tested by applying tension between the copper lead wires the failure occurs by breaking of the lead wire when its tensile strength is exceeded, rather than by the pulling away of the lead wire from the silver electrode surface. The strength of my improved electrical fastening construction, particularly adapted for use in attaching lead wires to electrical capacitors of the type specified, will be appreciated when it is understood that the ordinary No. 18 copper wire used as lead wires for such condensers will resist a tension of from 30 to 45 lbs. without breaking.

Accordingly, it is one of the objects of this invention to provide fastening or connection means for securing a lead wire to a ceramic silver surface, more especially for securing a lead wire to a ceramic silver surface in an electrical capacitor, which fastening or connection means is of more rugged construction and more resistant both to wear and to tensile stresses than ever previously attainable. It is another object of this invention to render available a fastening means particularly suitable for use in manufacturing electrical condensers of the type described in my previously referred-to copending applications, which fastening means possesses great strength and rigidity when subjected to deforming or separating influences. A new and improved method for securing these connections forms another object of my invention. These and still further objects of this invention will be apparent from the ensuing disclosure of certain preferred embodiments thereof.

Figure 2:
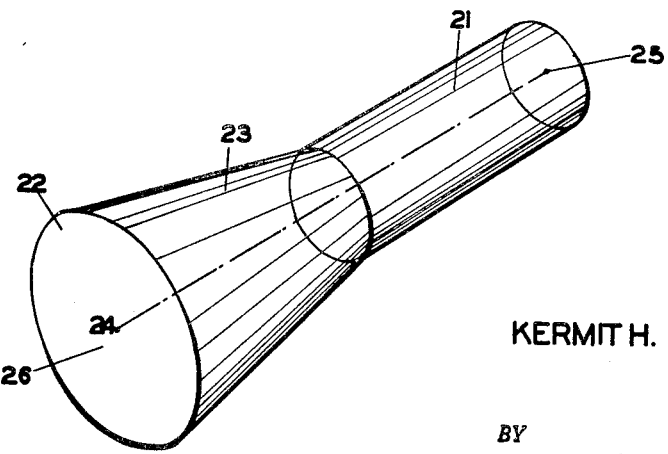
Figure 3:
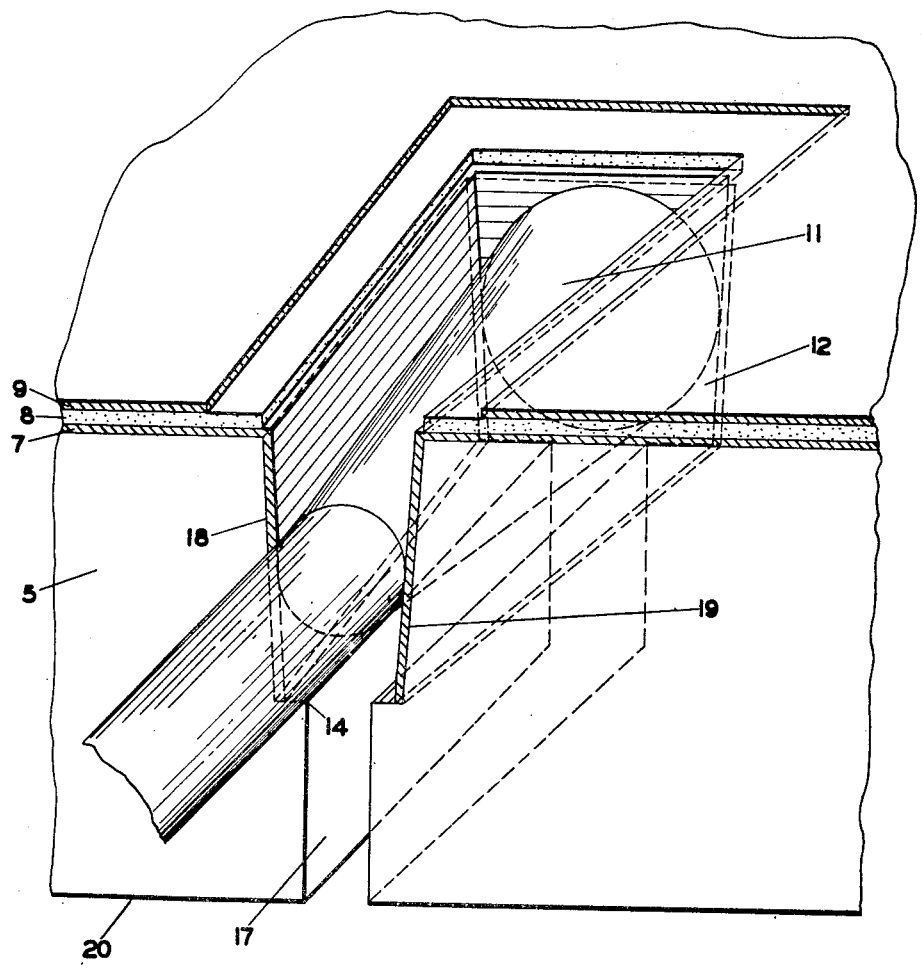
Figure 4:
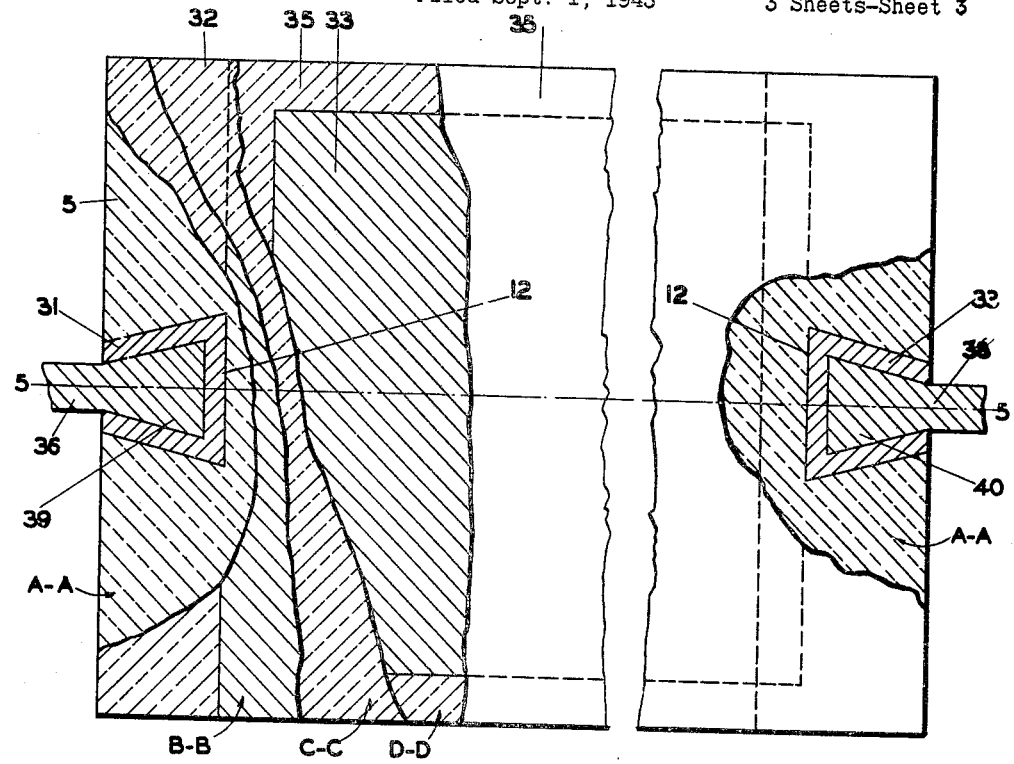
Figure 5:
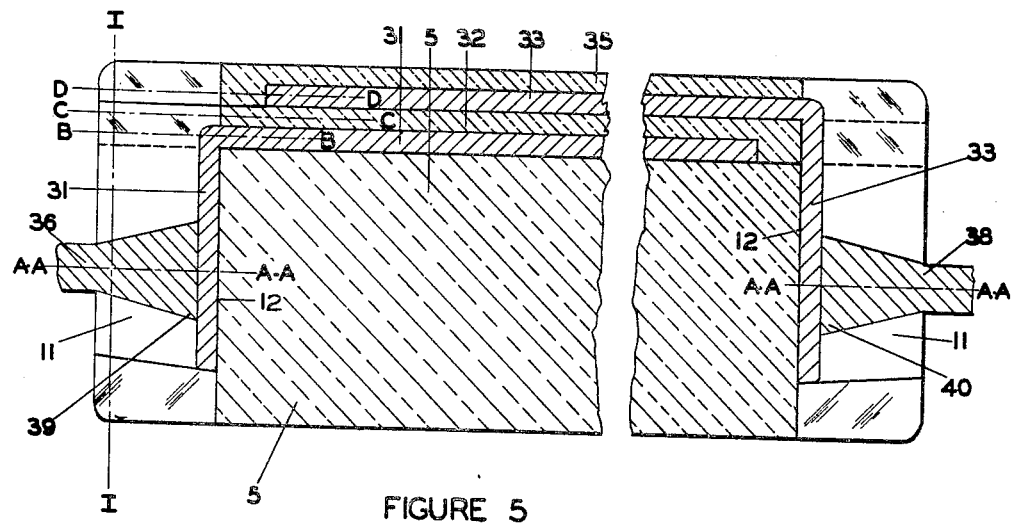

My invention is best explained with reference to the attached drawings wherein Figure 1 is a diagrammatic view taken approximately on the line I—I of Figure 5, looking in the direction of the arrows, which view shows the tapered opening in the ceramic block or tile member supporting the glass or enamel dielectric and metallic layer electrodes of the electrical capacitor, the end of the conducting lead wire (not shown) being adapted for securement in this tapered opening. Figure 2 is a diagrammatic view showing the end portion of the electrical conductor or lead wire, this end portion being suitably deformed or upset to permit of it being inserted in the tapered opening shown in Figure 1. Figure 3 is a diagrammatic view, taken approximately on the line I—I of Figure 5 and looking in the direction of the arrows of the complete assembly, this view showing the electrical conductor positioned in the tapered opening and so held in electrical communication with the silver layer electrode. Figure 4 is a plan view, some parts being cut away and some parts being shown in section in order to illustrate the construction more clearly, of a complete electrical capacitor of the type shown in my previously referred-to copending applications wherein the electrical lead wires are attached to the silver layer electrodes as herein described. In this figure the various letters A—A, B—B, C—C, and D—D indicate the plane, indicated by the corresponding markings on Figure 5, where the particular section is taken, the unshaded portion of Fig. 4 being in plan. Figure 5 is a cross-sectional view, some parts being shown in elevation taken on the line 5—5 of Figure 4.

Referring specifically to Figure 1, 5 denotes a ceramic base, tile or slab supporting member whereon the elements of an electrical condenser are positioned. These may include, as a minimum, electrode layers 7 and 9 separated by dielectric layer 8, this dielectric layer being preferably formed of a vitreous composition. In usual practice other electrode layers and other layers of separating dielectric may be present, but as they form no part of this invention and need not be described in order to explain it they are not shown in the drawings. This electrical capacitor or condenser may be constructed as disclosed and claimed in my above-identified copending applications.

As shown, at that portion of the ceramic base 5 adjacent tapered opening 11 one of the electrode layers 9 is spaced back from the opening to prevent short-circuiting between electrodes. Of course, either of the electrode layers 7 or 9 could be so spaced back, depending on which is to be brought into electrical communication with the conductor or lead wire as shown in Fig. 3. In practice one electrode layer will be spaced back at the tapered opening 11 for one lead wire connection at one end of the ceramic base 5, and the other spaced back at a similar tapered opening 11 for the other lead wire connection at the other end of the ceramic base 5.

The ceramic supporting block 5 is provided, as shown, with the previously referred-to tapered or wedge-shaped opening 11 which may be constructed generally in the form of a slightly deformed frustum of a pyramid. The larger base 12 of this quasi-frustum of a pyramid (hereafter for convenience the opening 11 is termed frusto-pyramidal, or a frustum of a pyramid), is at the inner end. As shown, this opening may be formed with a much narrower slit 17 extending from the bottom of the tapered opening 11 proper downwardly through the ceramic base block 5. This slit is not essential, but may be included for convenience in manufacturing the block or for placing the conductive metal layer or conductive cement on the interior surfaces of the tapered opening 11.

I have found that in order that the upset head or end portion of the lead wire 21 (shown in Fig. 2) may be properly seated in the tapered opening 11, as will be subsequently explained, it is desirable that the face edges 18 and 19 of tapered opening 11 make an angle of from approximately 75° to 85° with the flat edge 20 of the ceramic base 5, i. e. with the horizontal. This angle (with surface 14 generally parallel to flat edge 20) is indicated in Figure 1 of the drawings. As illustrated, the entire inside portions of tapered opening 12 may be coated with the metallic layer material forming the electrode 7 so that electrical conductivity between the two is provided.

Referring now to Figure 2, this view illustrates the electrical conductor or lead wire which is to be brought into communication with electrode layer 7 of the electrical capacitor. This conducting member 21 is formed with an enlarged or upset head portion 22 and a tapered connecting portion 23 extending between the two. This upset head portion 22 may have a diameter at the larger end approximately twice that of the diameter of the electric wire or conductor 21.

In forming the connection, as shown in Figure 3 the enlarged upset end 22 of the electrical conductor 21 is inserted firmly into the tapered opening 11 in ceramic block 5 in such a way that the end surface 26 of the large end of the upset portion 22 is in close communicating contact with the metallic layer on the large inner base 12 of the tapered opening 11. In this way electrical communication is provided between the conductor 21 and the electrode 7.

In order to secure satisfactory electrical conductivity and to hold the lead wire 21 securely in position it is desirable to place a small amount of solder in the tapered opening surrounding the upset or enlarged end portion 22. While I prefer to utilize solder for this purpose, it is also possible merely to dip or immerse the enlarged end portion 22 of the lead wire 21 in a conducting cement before introducing it into the tapered opening 11, this conducting cement serving to provide for electrical communication with the electrode 7 through the metallic layer 12 positioned in the interior of tapered opening 11, reliance being placed on the insulating cement later to be placed in the unfilled portions of the tapered opening 11 to hold the lead wire securely in place therein. Neither the solder or conductive cement, nor the insulating paste or enamel which is positioned in the tapered opening around the enlarged head portion 22 of lead wire 21 in order to seal off the entire construction, is shown in the drawings, as the arrangement of parts would be obscured thereby. This vitreous insulating enamel placed in unfilled portions of the frusto-pyramidal opening 11 provides the necessary electrical insulation and also serves to consolidate the joint and protect it from corrosion. The use of vitreous insulating enamel in this way is disclosed and claimed in the copending application of Deyrup, Serial No. 479,156, filed March 15, 1943, which matured into Patent No. 2,398,176, on April 9, 1946.

Referring more especially to Figures 4 and 5, the numeral 31 denotes one silver layer electrode separated by dielectric layer 32 from another silver layer electrode 33. As shown, the two silver layer electrodes are not coextensive in area, and are, of course, respectively positioned back from the tapered openings 11 except when joined to an electrical conductor at that tapered opening as previously explained. A vitreous cover coat 35 as disclosed, for example, in the copending application of Deyrup, Ser. No. 474,679, filed February 4, 1943, may be applied over the entire assembly after the lead wires 36 and 38 are positioned in identical tapered opening 11 in the ceramic base 5 in electrical communication with the electrodes 31 and 32 as previously described. In these figures, for convenience in illustrating, the insulating enamel cover coat is not shown around the metallic lead wires 36 and 38, but in practice the insulating enamel is also applied around the tapered openings 11 filled with the lead wires. The enamel may also be of an organic type as, for example, a wax or a resin such as one of the alkyd type ("Glyptal"). The cover coat may be applied to all parts of the electrical condenser before insertion of the electrical lead wires 36 and 38 by suitably masking the tapered openings 11, which may be later sealed off, if desired, after the electrical conductors have been positioned therein.

In forming the electrical connections the upset or enlarged terminal portions 39 and 40 of electrical conductors 36 and 38 are positioned in the tapered openings 11 provided in the base plate 5, said generally frusto-pyramidal openings being constructed as shown in Figure 1 as described above. As shown in the latter figure, the metallic layer comprising the electrodes in each instance is extended over onto the inner surfaces 12 of tapered openings 11, with which surfaces the enlarged head or upset terminal portions 39 and 40 of the conductors 36 and 38 are brought into electrical communication by abutting directly up against those surfaces or through a conductive cement or solder, or by the use of both expedients, thus providing direct electrical communication between electrode 31 and lead wire 36, and between electrode 33 and lead wire 38. The solder to provide electrical communication, or the conductive cement, may, as previously explained, be then incorporated in the unfilled portions of the tapered openings 11 in order to provide better electrical communication between conductors 36 and 38 and the interior metal-coated surfaces 12 of tapered openings 11, the latter being in direct electrical circuit with the respective electrodes 36 and 38.

It is obvious that while I have described my improved electrical connection and the method of forming this connection with particular reference to electrical capacitors or condensers, it may be used in other apparatus for other purposes, wherever lead wires or metallic conductors are to be brought into electrical communication with metal surfaces or layers.

Various changes may be incorporated in my preferred embodiment as above described and these changes insofar as they come within the scope of my invention, are intended to be comprehended in the claims.

I claim:

1. Securement means for securing an electrical lead wire in electrical communication with an electrode surface which comprises: an electrical lead wire provided with an enlarged head portion generally in the form of a frustum of a cone; an insulating member provided with a receptor opening, said receptor opening being generally in the shape of a frustum of a pyramid, the narrower end section of said frustum of a pyramid being adjacent the external surface of said insulating member; an electrically conductive layer positioned on the interior surfaces of said receptor opening in electrical communication with the electrode surface which is to be brought into electrical communication with said lead wire; and means for positioning said generally frusto-conical head portion of said electrical lead wire in said receptor opening in such position that it is securely retained therein and is in electrical communication with said conductive layer on the interior surfaces of said receptor opening.

2. The method of securing electrical lead wires to an electrical capacitor, said electrical capacitor comprising a ceramic base member on which there are mounted a plurality of layers of metallic electrodes and a plurality of interposed layers of vitreous dielectric which comprises: providing a plurality of electrical lead wires, the terminal portions of said lead wires being formed in generally frusto-conical form; providing a plurality of receptor openings in said ceramic base member, said receptor openings being generally of frusto-pyramidal form; providing on the interior surfaces of said frusto-pyramidal receptor openings a plurality of metallic electrically conductive layers, each of said layers being in electrical communication with an electrode of said electrical capacitor; positioning said enlarged frusto-conical head portions of each of said lead wires in said frusto-pyramidal receptor openings; and introducing an electrically conductive paste into unfilled portions of said receptor openings whereby electrical communication is provided between said enlarged head portions, said interior metallic conductive layers, and each of said electrodes of said electrical capacitor.

3. The method of securing an electrical lead wire to one of the electrodes of an electrical capacitor, said electrical capacitor comprising a plurality of electrode plates separated by layers of dielectric positioned on an insulating base which comprises: providing an electrical lead wire with an enlarged head portion; forming in said insulating base a generally tapering receptor opening, said opening being larger toward the interior of said insulating base than it is adjacent the external surfaces thereof; providing on the interior surfaces of said receptor opening an electrically conductive layer in electrical communication with said electrode to be connected; positioning said enlarged head portion of said electrical lead wire in said tapering receptor opening; introducing a conductive material into unfilled portions of said receptor opening surrounding said enlarged head portions of said lead wire, whereby electrical communication is provided between said lead wire and said electrode through the interior conductive layer of said receptor opening; and covering the resulting attachment with an electrically insulating material, whereby said electrical connection may be electrically sealed from current leakage losses.

4. The method of securing an electrical lead wire to a metallic electrode surface which comprises: providing an electrical lead wire having at its terminal portion an enlarged head portion generally in frusto-conical form; providing in the base member supporting said metallic electrode surface a generally frusto-pyramidal receptor opening, the larger portion of said frusto-pyramidal receptor opening being positioned toward the interior of said base member; providing on the interior surfaces of said frusto-pyramidal receptor opening a metallic conducting layer, said metallic conducting layer being in electrical communication with said metallic electrode; positioning said frusto-conical head portion of said lead wire in said frusto-pyramidal receptor opening; filling unoccupied portions of said frusto-pyramidal receptor opening with solder, whereby electrical communication is provided between said head portion of said lead wire, said interior conductive surface, and said metal electrode, and placing in other unoccupied portions of said frusto-pyramidal opening a vitreous insulating enamel, whereby said lead wire is securely retained in position in said frusto-pyramidal opening.

5. The method of securing electrical lead wires to an electrical capacitor, said electrical capacitor comprising a ceramic base member on which there are mounted a plurality of layers of metallic electrodes and a plurality of interposed layers of vitreous dielectric which comprises: providing a plurality of electrical lead wires, the terminal portions of said lead wires being formed in generally frusto-conical form; providing a plurality of receptor openings in said ceramic base member, said receptor openings being generally of frusto-pyramidal form; providing on the interior surfaces of said frusto-pyramidal receptor openings a plurality of metallic electrically conductive layers, each of said layers being in electrical communication with an electrode of said electrical capacitor; positioning said enlarged frusto-conical head portions of each of said lead wires in said frusto-pyramidal receptor openings; and introducing a mass of solder into unfilled portions of said receptor openings whereby electrical communication is provided between said enlarged head portions, said interior metallic conductive layers, and each of said electrodes of said electrical capacitor, and said lead wires are securely held in position in said receptor openings.

6. The method of securing electrical lead wires to an electrical capacitor, said electrical capacitor comprising a ceramic base member on which there are mounted a plurality of layers of metallic electrodes and a plurality of interposed layers of vitreous dielectric which comprises: providing a plurality of electrical lead wires, the terminal portions of said lead wires being formed in generally frusto-conical form; providing a plurality of receptor openings in said ceramic base member, said receptor openings being generally of frusto-pyramidal form; providing on the interior surfaces of said frusto-pyramidal receptor openings a plurality of metallic electrically conductive layers, each of said layers being in electrical communication with an electrode of said electrical capacitor; positioning said enlarged frusto-conical head portions of each of said lead wires in said frusto-pyramidal receptor openings; introducing a mass of solder into unfilled portions of said receptor openings whereby electrical communication is provided between said enlarged head portions, said interior metallic conductive layers, and each of said electrodes of said electrical capacitor; and filling other unoccupied portions of said receptor openings with an insulating vitreous enamel which serves to insulate and securely retain in place in said receptor openings said electrical lead wires.

7. The method of securing an electrical lead wire to one of the electrodes of an electrical capacitor, said electrical capacitor comprising a plurality of electrode plates separated by layers of dielectric positioned on an insulating base which comprises: providing an electrical lead wire with an enlarged head portion; forming in said insulating base a generally tapering receptor opening, said opening being larger toward the interior of said insulating base than it is adjacent the external surfaces thereof; providing on the interior surfaces of said receptor opening an electrically conductive layer in electrical communication with said electrode to be connected; then dipping said enlarged head portion of said electrical lead wire in conductive paste, and then positioning said enlarged head portion in said tapering receptor opening, said conductive paste serving to establish electrical communication between said lead wire and said electrode through the interior conductive layer of said receptor opening; and covering the resulting attachment with an electrically insulating material, whereby said electrical connection may be electrically sealed from current leakage losses.

8. The method of securing an electrical lead wire to one of the electrodes of an electrical capacitor, said electrical capacitor comprising a plurality of electrode plates separated by layers of dielectric positioned on an insulating base which comprises: providing an electrical lead wire with an enlarged head portion; forming in said insulating base a generally tapering receptor opening, said opening being larger toward the interior of said insulating base than it is adjacent the external surfaces thereof; providing on the interior surfaces of said receptor opening an electrically conductive layer in electrical communication with said electrode to be connected; then dipping said enlarged head portion of said electrical lead wire in conductive paste, and then positioning said enlarged head portion in said tapering receptor opening, said conductive paste serving to establish electrical communication between said lead wire and said electrode through the interior conductive layer of said receptor opening; positioning solder in unfilled portions of said tapering receptor opening to assist in holding said lead wire securely in position in said receptor opening.

9. The method of securing an electrical lead wire to one of the electrodes of an electrical capacitor, said electrical capacitor comprising a plurality of electrode plates separated by layers of dielectric positioned on an insulating base which comprises: providing an electrical lead wire with an enlarged head portion; forming in said insulating base a generally tapering receptor opening, said opening being larger toward the interior of said insulating base than it is adjacent the external surfaces thereof; providing on the interior surfaces of said receptor opening an electrically conductive layer in electrical communication with said electrode to be connected; dipping said enlarged head portion of said electrical lead wire in conductive paste, and then positioning said enlarged head portion in said tapering receptor opening, said conductive paste serving to establish electrical communication between said lead wire and said electrode through the interior conductive layer of said receptor opening; positioning solder in unfilled portions of said tapering receptor opening to assist in holding said lead wire securely in position in said receptor opening; and filling other unfilled portions of said receptor opening with a vitreous insulating enamel which serves to insulate said connection and hold the members thereof securely in place.

KERMIT H. BALLARD.